Figure 3:
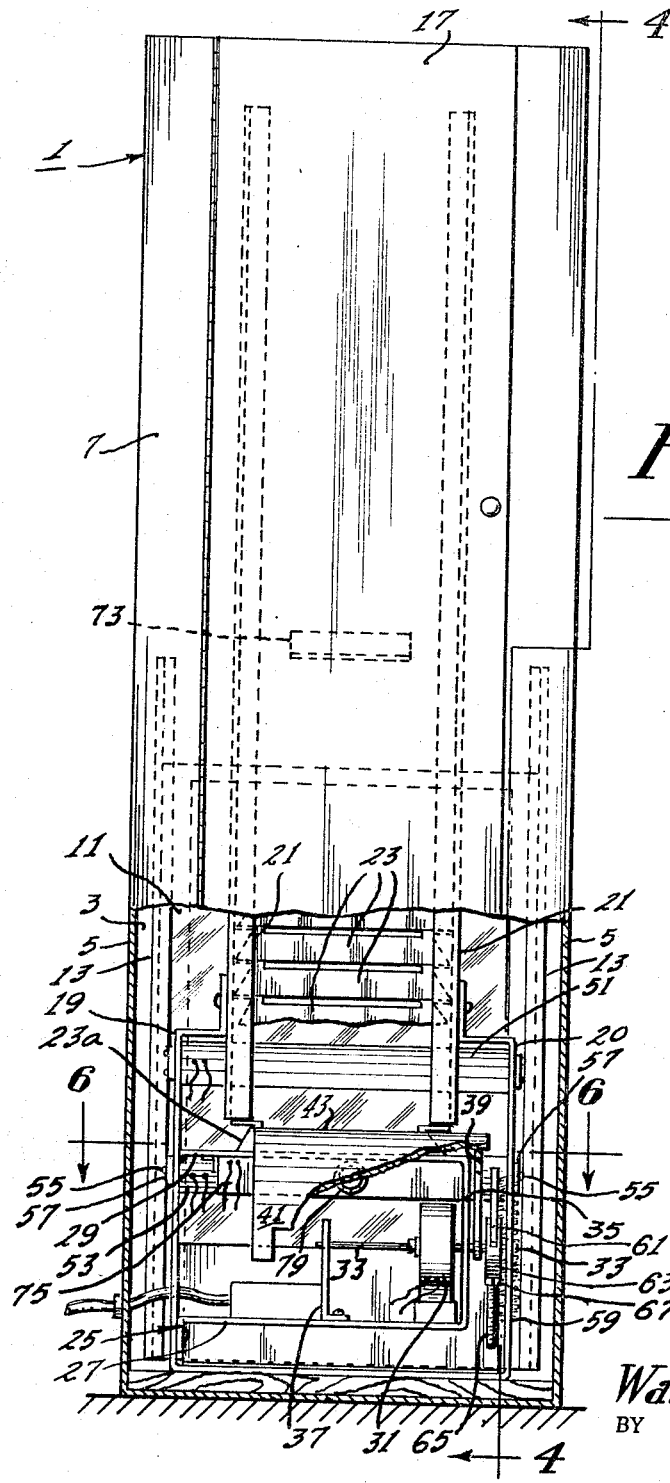

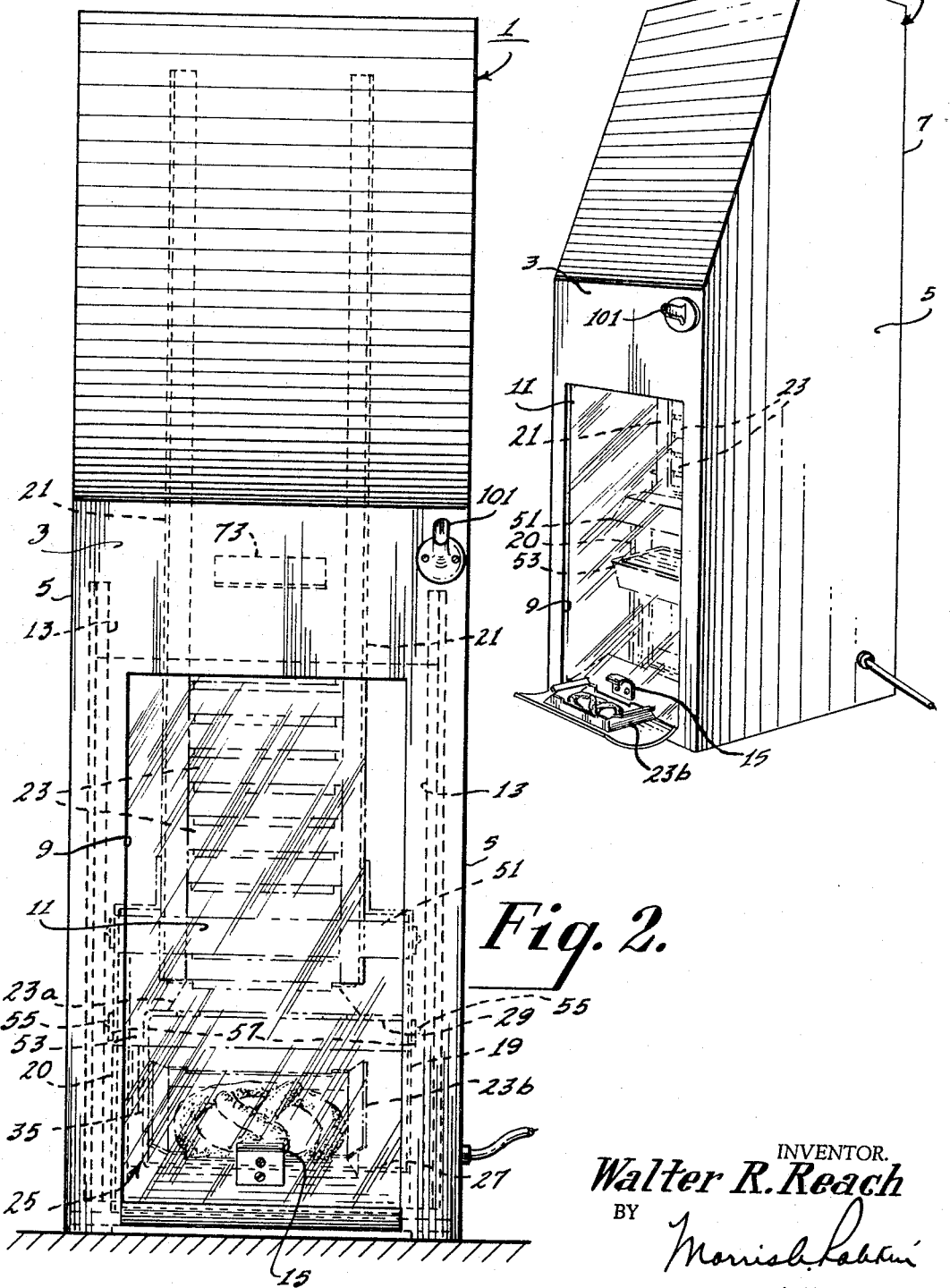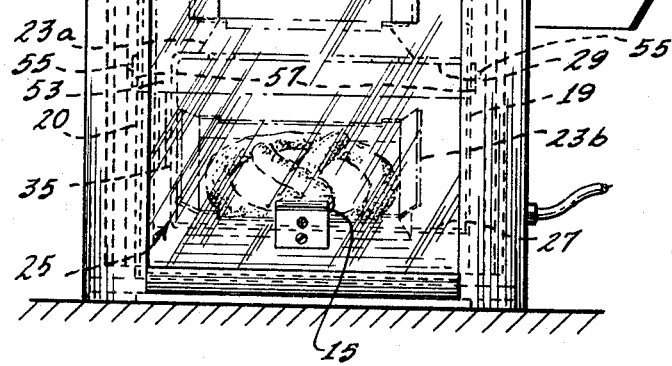

July 4, 1967   W. R. REACH   3,329,080
VENDING APPARATUS
Filed April 2, 1965   4 Sheets-Sheet 2

INVENTOR.
Walter R. Reach
BY
ATTORNEY.

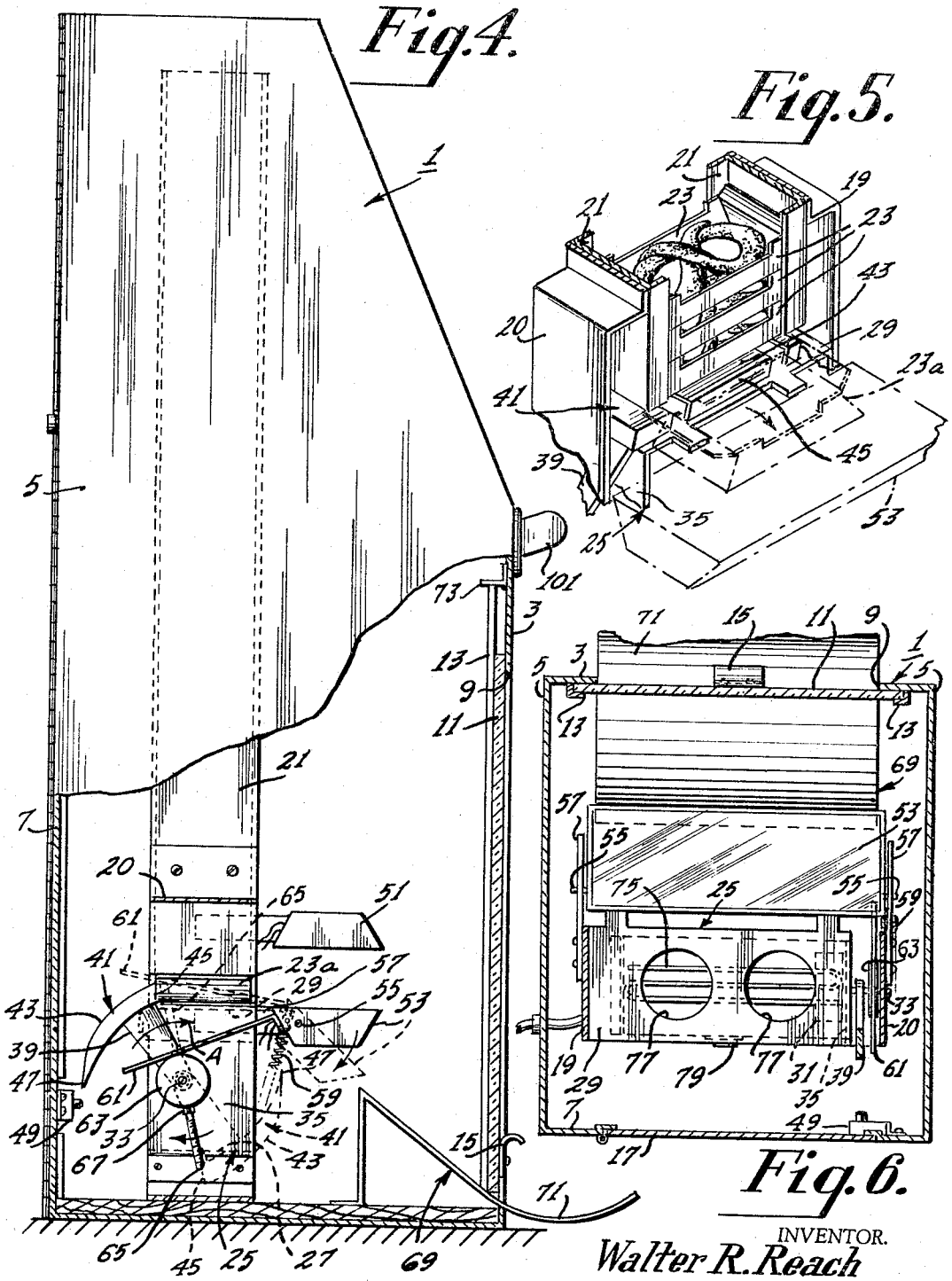

INVENTOR.
Walter R. Reach
BY
ATTORNEY.

United States Patent Office 3,329,080
Patented July 4, 1967

3,329,080
VENDING APPARATUS
Walter R. Reach, 588 Washington Terrace,
Audubon, N.J. 08106
Filed Apr. 2, 1965, Ser. No. 445,182
6 Claims. (Cl. 99—357)

This invention relates to vending apparatus, and particularly to apparatus for vending products which require heating prior to being dispensed, the present invention being in the nature of an improvement over that disclosed in my copending application, Ser. No. 380,456, filed July 6, 1964 now Patent No. 3,245,581, granted on Apr. 12, 1966.

There are a number of comestible products which, while quite edible in the cold state (i.e., at ambient temperature), are more palatable and inviting when warmed to a higher temperature. Among such products are the so-called soft pretzels made of dough. Such pretzels can be prepared in various ways for vending, one such way, for example, being disclosed in the Reach Patent 3,026,824. According to the method of this patent, the pretzels can be baked and delivered immediately in the hot state by an attendant at the baking premises.

In some cases, it may be desirable to pre-bake and store the pretzels or other comestible products for subsequent heating and vending. This is particularly desirable when there is no attendant at the premises. Again, in anticipation of large and more or less concentrated demand for soft pretzels at sports stadiums, market places, or the like, it may be desirable to pre-bake a large quantity of such pretzels and store them for later delivery to consumers on demand. Stored pretzels will, of course, become cold. In some cases, they may even be subjected to freezing to preserve them. In the case of soft pretzels, if they are stored for a time, they may absorb moisture from the ambient and become soggy, unattractive and unpalatable. To make them attractive and acceptable to customers, they must be heated again (1) to drive off excess moisture without, however, making them altogether dry and crisp, and (2) to render them just warm enough to be pleasingly palatable.

In my above-identified copending application, there is disclosed a coin-controlled vending apparatus in which comestible products can be stored in a number of magazines from which the stored products can be removed, one at a time, and transferred by conveyor means to a heating station for heating thereof. After being heated for a suitable period of time, the heated products are removed from the heating station and discharged to a dispensing opening at which a purchaser can gain access to the heated product. The apparatus of the aforesaid copending application requires several product transferring operations that involve two or more separate transfer mechanisms. Another limitation of that apparatus is that, while the product released from one of the magazines is being transferred and heated, no other product can be similarly processed through the apparatus until processing of the first released product has been completed.

The primary object of the present invention is to provide an improved and simplified vending apparatus in which comestible products to be dispensed in heated condition can be stored for successive release, heating and discharge to a point of access with minimum handling and movement.

More particularly, it is an object of this invention to provide improved, coin-controlled, vending apparatus for storing prepackaged comestible products such as soft pretzels, pizza pies, buns, pastry, frankfurters, nuts, and the like, and for subjecting such products, on demand, to controlled heating just prior to delivery thereof to a purchaser in readiness for immediate consumption.

Another object of this invention is to provide improved vending apparatus as aforesaid which can be operated to dispense a multiplicity of the products concurrently if desired.

Still another object of this invention is to provide improved vending apparatus as above set forth in which the time of heating or warming can be varied readily by a simple adjustment to suit the requirements of the comestible product being dispensed.

A further object of this invention is to provide, in improved vending apparatus of the type set forth, improved heating means a portion of which can act to discharge the heated product to a delivery point by itself without need for additional product discharging means for this purpose.

It is also an object of this invention to provide improved comestible product vending apparatus which is quite simple in construction, thoroughly reliable and highly efficient in use, economical to produce, and of a minimum number of parts.

In accordance with one form of the present invention, the vending apparatus may comprise a cabinet enclosed structure having one or more vertically disposed storage magazines in which a plurality of container packaged comestible products, such as soft pretzels, can be stacked vertically on each other. Successively lowermost ones of the packages are discharged from their respective magazines by a coin controlled pusher device at each magazine. Each pusher device is controlled by a separate coin operated relay circuit which is independent of the others. Thus, any one or more of the pusher devices can be operated concurrently at any chosen time.

Each pusher device is constructed and disposed to support the stack of product packages above the lowermost one while it advances the latter directly to a heating station between, and onto the lower one of, two vertically separated heating units. The advanced product is held stationary at the heating station for a present time interval sufficient to permit suitable heating of the comestible product from both above and below it by the two heating units. During this time, the pusher device is returned to its initial or rest position to be ready, when actuated again, to advance the next succeeding lowermost package to the heating station.

The lower one of the heating units (on which the product at the heating station rests while being heated) is pivotally mounted for tilting movement. As the pusher device nears its normal, rest position, cam means associated therewith and also with the tiltable heating unit causes the latter to tilt sufficiently to permit the just heated product to slide off onto an inclined shelf which terminates at an access opening. The cam means is adjustable to effect tilting of the lower heating unit after a desired period of time. In this way, the time interval during which the product at the heating station is heated can be controlled easily. Preferably, the cabinet is provided with a slidable window at the aforementioned opening. This window is normally closed and acts as a stop for the heated product as it slides down along the aforesaid shelf, thus preventing the discharged, heated package from sliding off the shelf onto the floor. The purchaser need only raise the window to gain access to the heated package.

In the case of some products, to retain their freshness or to keep them from spoiling, it may be necessary to refrigerate them while they are stored for relatively long periods of time before being loaded into the vending apparatus of this invention. In such case, it may be desirable to thaw out or preheat the cold products before transferring them from the magazines to the heating stations. For this purpose, there may be provided, at each magazine, a supplementary heater which is so positioned as to preheat and thaw out, if necessary, each product by the time it reaches the lowermost position in the stack. These supplementary heaters may be controlled either manually or automatically by means of thermostats.

Figure 7:
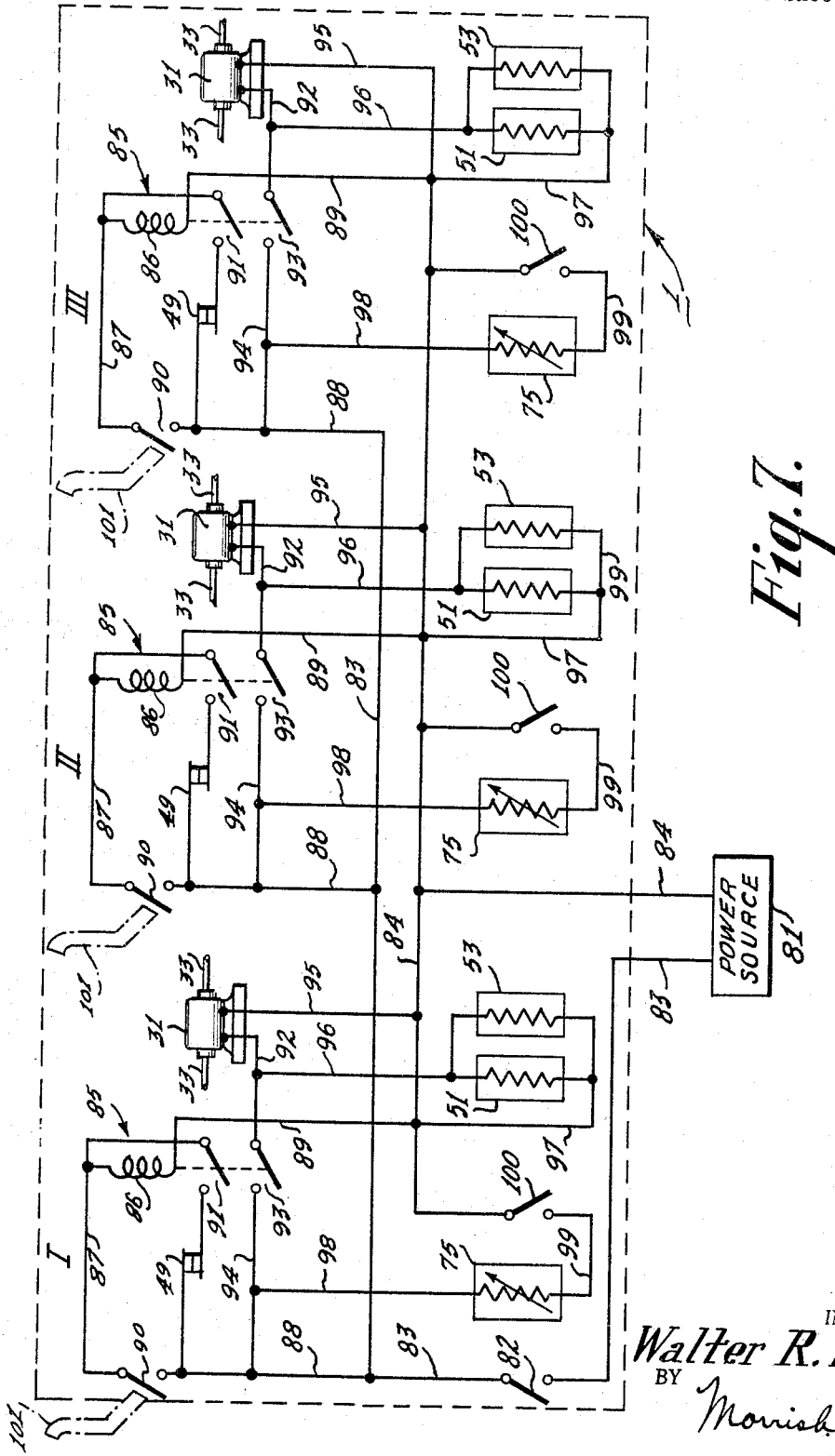

The novel features of the present invention, both as to its organization and method of operation, as well as additional objects and advantages thereof, will be understood more readily from the following description, when read in connection with the accompanying drawings, in which:

FIG. 1 is a front perspective view of one form of vending apparatus according to this invention, this form including only a single magazine and associated parts merely by way of illustration, FIG. 2 is a front elevational view thereof, FIG. 3 is a rear elevational view thereof, partly broken away to more clearly show the operating mechanism within the cabinet, FIG. 4 is a view partly in side elevation and partly in section taken along the line 4—4 of FIG. 3 and viewed in the direction of the appended arrows, FIG. 5 is a fragmentary perspective view showing certain details of the magazine structure, the pusher device, and the tiltable heater unit, FIG. 6 is a sectional view taken along the line 6—6 of FIG. 3 and viewed in the direction of the appended arrows, and FIG. 7 is a schematic diagram of one form of electric circuit useful in the vending apparatus of this invention to effect the various steps of the operating cycle.

Referring more particularly to the drawings, there is shown a cabinet 1 having a front wall 3, side walls 5 and a rear wall 7. The front wall 1 is formed with an opening 9 which is normally closed by a closure 11, preferably a transparent window through which operation of the parts within the cabinet can be observed. The closure window 11 is mounted for vertical sliding movement in guides 13 on the inside surface of the front wall 3. A handle 15 on the closure 11 facilitates raising thereof for a purpost presently to be set forth. The rear wall 7 may be provided with a hinged door 17 for normally closing off the interior of the cabinet, but which can be opened to gain access to the interior when necessary.

Secured to the base or floor of the cabinet is a substantially U-shaped frame having a pair of opposed, upstanding standards 19 and 20. To the upper ends of these standards are secured a pair of opposed channel members or chutes 21 constituting a magazine in which a plurality of packages 23 of comestible products, such as soft pretzels, can be stored vertically on each other by insertion through the open, upper end of the magazine structure 21. The products are preferably packaged in containers of the type disclosed in my aforementioned copending application Ser. No. 380,456, and in Reach Patent No. 3,244,352, granted in Apr. 5, 1966, but any suitable containers may be used so long as they can be stacked vertically in the magazine 21 for easy sliding movement therealong. Secured to the standard 19 is a frame 25 having a lower shelf 27 and an upper shelf 29. When the packages 23 are loaded in the magazine, the lowermost package 23a (FIG. 1) rests on the shelf 29, the later shelf being spaced from the lower end of the magazine 21 a distance such that the package 23a is free to be pushed out from under the magazine in a manner presently to be described.

Mounted on the lower shelf 27 is an electric motor 31 having a shaft 33 which extends in opposite directions from the opposed ends thereof. Support for the shaft 33 may be provided by bearings (not shown) in the standard 20, the vertical arm 35 of the frame 25, and a bracket 37 secured to the lower shelf 27. Fixed to the shaft 33 for rotation therewith is a radial arm 39 of a pusher member 41 which removes from the stack the successive packages 23a on the shelf 29 and transfers them, one at a time, to a heating station (hereinafter described more fully) while, at the same time, supporting the remaining packages stacked in the magazine 21.

When the motor 31 is in de-energized condition, its shaft 33 is in such a position as to hold the pusher member 41 substantially to one side of the magazine 21 (as seen in FIG. 4), or behind the magazine as viewed from the front of the cabinet. The member 41 is formed with an arcuate surface 43 that terminates in a wall or flange 45 (see FIG. 5) along its leading edge in the direction of rotation thereof (as shown by the arrow A in FIG. 4) and in a tapered, thin trailing end 47. When the motor 31 is energized, as described hereinafter, it rotates the shaft 33 and the member 41 to cause the member 41 to enter between the shelf 29 and the lower end of the magazine. The flange 45 thereupon engages the package 23a on the shelf 29 and pushes it out onto a normally stationary support at the aforementioned heating station. At the same time, the arcuate surface 43 of the member 41 comes under the then lowermost package 23 in the stack within the magazine 21 to temporarily support that stack and prevent it from dropping down onto the shelf 29. When the removed package 23a has been transferred to the heating station, the trailing end 47 of the member 41 is removed from under the stacked packages in the magazine upon continued rotation of the member 41. The stack within the magazine 21 is then free to drop down to bring the then lowermost package to rest on the shelf 29.

As the member 41 approaches close to its rest position, a normally closed switch 49, which may be mounted on the rear wall 7 of the cabinet or on any other suitable support in the path of the trailing end 47, is engaged by the trailing end 47 to be opened thereby momentarily. Opening of the switch 49 causes the motor 31 to become de-energized and thus stop rotation of the shaft 33 and the member 41. A suitable brake may be used, if necessary, to prevent the motor from coasting and to insure stopping of the member 41 in its normal, rest position in readiness for the next cycle of operation during which the above described steps are repeated.

Also mounted on the standards 19 and 20 in proximity to the upper shelf 29 and the magazine 21 are a pair of vertically spaced and aligned heating units 51 and 53. The upper heating unit 51 is fixedly secured to the standards, but the lower heating unit 53 is pivotally mounted for tilting movement on a pair of aligned pivot pins 55 carried by opposed arms 57 secured to the standards 19 and 20. A coil spring 59, having one end anchored to the unit 53 and its other end to the standard 20, normally maintains the lower unit 53 in its most counter-clockwise, substantially horizontal, rest position, as shown by the solid lines in FIG. 4.

Secured to the unit 53 and extending rearwardly therefrom is an arm 61 which bears against the edge of a cam disk 63 in response to the spring 59. The disk 63 is secured to the motor shaft 33 for rotation therewith and it has threaded radially thereinto an adjustable screw 65 which can be locked in any desired position by a nut 67. The periphery of the disk 63 may be circular. Hence, when the shaft 33 begins to rotate, the lower unit 53 remains stationary for a period of time so that the package 23a transferred thereto by the member 41 can be heated by both of the heating units 51 and 53 while supported on the unit 53. Containers such as disclosed in my above-identified copending application and in said Patent No. 3,244,352 have openings in the bottom thereof to facilitate heating the packaged products by the lower heater 53. After a period of time, the free end of the screws 65 engages the arm 61 and causes the unit 53 to gradually tilt clockwise (FIG. 4) to the dotted line, discharge position. When the heating unit 53 is in this discharge position, the heated package slides off therefrom onto an inclined shelf 69 which is mounted on the floor of the cabinet in proximity to the heating station and which extends out through the opening 9 to terminate in an upwardly curved portion 71 externally of the cabinet. As the shaft 33 and the cam disk 63 continue to rotate, the lower heating unit gradually returns to its rest position in response to the spring 59. By adjusting the screw 65 on the disk 63, the point in the cycle of rotation of the disk 63 at which the screw will engage the arm 61 can be varied. In this way, the time interval during which the package 23a is heated can be controlled.

As stated above, the window closure 11 is normally in its lowermost, closed position, as shown in FIGS. 1, 2 and 4. Thus, when the heated, discharged package 23b slides down along the shelf 69, it strikes the closure, as seen in FIG. 2, which thus prevents the discharged package from continuing on to the curved shelf portion 71 and, possibly, falling to the floor. To gain access to the heated package, the window 11 is raised by means of the handle 15 until the window engages a stop 73 secured to the inner surface of the wall 3. The stop 73 limits opening of the window just enough to permit the heated package 23b to slide out slowly to the curved shelf portion 71 from which the purchaser can lift it freely. However, when the window 11 is fully raised, as determined by the stop 73, the opening 3 is not exposed enough to permit one to insert an arm to the heating units or to other parts of the apparatus. Thus, burning of one's hands and injury to the working parts of the apparatus are avoided.

In the case of some products, it may be desirable to freeze, or at least refrigerate, them during storage before stacking them in the magazine 21. For such products, it may be necessary to thaw them out or preheat them before advancing them to the above-described heating station. This can be accomplished by means of an auxiliary heater 75 which may be mounted on the lower surface of the upper shelf 29. In such case, the shelf 29 is preferably provided with openings 77 to permit heat generated by the auxiliary heater to pass up readily toward the packages in the stack. As the packages in the stack move down gradually, they are brought more and more under the influence of the heat generated by the auxiliary heater 75 and they are thus given an initial warming up before being transferred to the main heaters 51 and 53. The auxiliary heater may be of a variable type and adjustable either manually by a control knob 79, or automatically by means of a thermostat (not shown) to variably control the heat generated thereby, if desired.

In the vending apparatus described above, only one magazine and associated parts have been included in the cabinet 1 by way of example. It will be apparent, however, that there may be included in a single cabinet two or more such vending units. In FIG. 7, there is shown, again by way of example only, a circuit diagram for three such identical units I, II and III in a single cabinet 1, each being operable independently of the others so that all can be operated concurrently, if desired, to furnish more than one product at the same time.

Referring, now, to FIG. 7, there is shown a circuit which can be connected to a suitable power source 81 through a main switch 82 and line conductors 83 and 84. Each vending unit I, II and III includes a holding relay 85 having a winding 86 connected to the power source through conductors 87, 88 and 89, and through a normally open, coin controlled switch 90, as well as the main switch 82 and the conductors 83 and 84. Each winding is also connected to the power line through a normally open relay switch 91 and the normally closed switch 49 referred to above. One terminal of each motor 31 is connected to the conductor 83 by a conductor 92, a second, normally open relay switch 93, a conductor 94, and the conductor 88, while the other terminal of each motor is connected to the conductor 84 by a conductor 95. Similarly, each pair of main heating units 51 and 53, which may be connected in parallel relation, is connected to the conductor 92 by a conductor 96, and to the conductor 84 by a conductor 97. The respective auxiliary heaters 75 are connected to the associated conductors 94 and to the conductor 84 through conductors 98 and 99 and their respective switches 100.

At the location of each vending unit I, II and III, the cabinet 1 is provided with a coin receiving member 101. The main switch 82 controls the circuitry at all of the vending units. With the main switch 82 closed, when a coin is deposited in any one of the coin receiving members 101, it causes the normally open switch 90 to close. Current immediately flows from the power source 81 through the conductor 83, the main switch 82, the conductor 88, the now closed switch 90, the conductor 87, the winding 86, the conductor 89, the conductor 84 and back to the power source 81. As soon as the relay winding 86 is energized, it closes the switches 91 and 93. Hence, current continues to flow to the winding 86 from the conductor 88 through the switches 49 and 91 to maintain the winding energized even though the switch 90 opens up after a very short time interval. When the switch 93 is closed, current flows therethrough to the motor 31 to energize it for rotation of the shaft 33. At the same time, current also flows through the switch 93 to the main heating units 51 and 53 to energize them. The actuated apparatus then goes through the complete cycle of transferring the lowermost package 23a of the stack to the heating station, heating it thereat, and then discharging the heated package to the position represented by the discharged package 23b. As the member 41 nears its rest position, its trailing end 47 engages the switch 49 and opens it momentarily. This breaks the circuit to the relay winding 86 to effect opening of the switches 91 and 93. Thus, the motor 31 and the heating units 51 and 53 are all de-energized and the parts are respectively restored to their normal, rest positions and conditions. The auxiliary heaters 75 can, of course, be operated independently of the main heaters 51 and 53 at will through their respective switches 100.

From the foregoing description, it will be apparent that the present invention provides improved vending apparatus for heating comestible and other products which require heating before being dispensed, the apparatus of this invention being of simple design and structure and requiring minimum handling of the products to be dispensed. Only one embodiment of the invention has been described, but it will undoubtedly be apparent to those skilled in the art that other embodiments thereof, as well as modifications of that described herein, all coming within the spirit of this invention, are possible. For example, instead of pivotally mounting the lower heating unit 53 so it can be tilted to discharge a heated product thereon, it can be mounted in a fixed position and a yoke-like support pivotally mounted thereover in straddling relation therewith for supporting a removed package at the heating station and then discharging the heated products. Other changes within the spirit of this invention will, no doubt, readily suggest themselves. It is desired, therefore, that the foregoing description shall be considered merely as illustrative, and not in a limiting sense.

What is claimed is:

1. Vending apparatus comprising, in combination, storage means in which a plurality of products can be stored in vertically stacked relation for removal therefrom, one at a time, from the lower end of the stack, means below said storage means for removing successive lowermost ones of said products from said stack while temporarily supporting the remaining ones of said stacked products in said storage means, means in proximity to said storage means providing a heating station at which said removed, successive products can be heated, normally stationary means at said station having a rest position for receiving each said product removed from said storage means by said removing means and for supporting the respective said removed products at said station during heating thereof, said supporting means being pivotally mounted for tilting to a discharge position for discharging the respective said products at the conclusion of heating thereof, means for moving said supporting means from its said rest position to its said discharge position and vice versa, said means for removing said products from said stack comprising a member mounted for rotation about an axis, said member having an arcuate surface terminating in a product engaging flange along its leading edge in the direction of its rotation, said member being normally disposed in a rest position to one side of said storage means so as to be clear of said stack, means comprising an electric motor for rotating said member to bring its said flange into engagement with the lowermost one of said products in said stack and remove said latter product from said stack as said member is rotated and also to concurrently bring its said arcuate surface under that one of said stacked products which is next above said product being removed by said flange to thus cause said member to support the remaining products in said stack while said lowermost product is being removed and transferred to said normally stationary supporting means at said heating station, said motor having a normally open switch in circuit therewith, means for closing said switch to thereby effect energization of said motor and rotation of said member through a cycle which includes removal of said lowermost product from said stack and then back to its said rest position, and means responsive to said member as it nears its said rest position for causing said switch to open to thereby stop said motor for holding said member in its said rest position.

2. Vending apparatus comprising, in combination, storage means in which a plurality of products to be heated before being dispensed can be stored for removal therefrom one at a time, a pair of vertically spaced heating units disposed to one side of said storage means, the lower one of said heating units being pivotally mounted for tilting movement from a normally stationary, substantially horizontal, rest position to an inclined discharging position, means for removing said products one at a time from said storage means and transferring them to said lower heating unit while said lower heating unit is in its said rest position, means for energizing said heating units, and means for (1) tilting said lower heating unit to its said discharge position at the conclusion of heating of a removed product thereon to thereby cause said tilted heating unit to discharge said last mentioned product therefrom and (2) then returning said tilted heating unit to its said rest position.

3. Vending apparatus according to claim 2 wherein said tilting means comprises an adjustable element cooperable with said lower heating unit and adjustable to vary the time at which it will effect tilting of said lower heating unit after a removed said product has been transferred to said lower heating unit by said removing means whereby to vary the heating time interval for the respective products on said lower heating unit.

4. Vending apparatus according to claim 2 wherein said lower heating unit has an arm extending therefrom, and wherein said tilting means comprises a rotatable cam member cooperable with said arm for effecting tilting of said lower heating unit, said cam member being adjustable to vary the time at which it will effect tilting of said lower heating unit after a removed said product has been transferred to said lower heating unit by said removing means whereby to vary the heating time interval for the respective products on said lower heating unit.

5. Vending apparatus according to claim 2 characterized by the addition of an inclined shelf in proximity to said lower heating unit for receiving heated products discharged thereby.

6. Vending apparatus comprising, in combination, a magazine in which a plurality of products can be stored and confined in vertically stacked relation for removal from the stack one at a time at the lower end of said stack, first supporting means under said magazine for supporting said stack, said first supporting means being spaced from said magazine a distance such that the lowermost one of said stacked products is clear of said magazine, means below and normally in a rest position to one side of said magazine for removing successive lowermost ones of said products resting on said first supporting means by entering between said magazine and said first supporting means to a second position, said removing means, when entered between said magazine and said first supporting means, engaging that one of said stacked products next above said lowermost one to thereby temporarily support the remaining said products in said stack while said lowermost product is being removed thereby, means for moving said removing means from its said rest position to said second position thereof and then back to said rest position, means in proximity to said first supporting means providing a heating station at which said removed, successive products can be heated, normally stationary second supporting means at said station having a rest position for receiving each said product removed from said stack by said removing means and for supporting the respective said removed products at said station during heating thereof, said second supporting means being pivotally mounted for tilting to a discharge position for discharging therefrom the respective said products thereon at the conclusion of heating thereof, means for moving said second supporting means from its said rest position to its said discharge position and vice versa, said removing means comprising a member mounted for rotation about an axis, said member having an arcuate surface terminating in a flange along its leading edge in the direction of its rotation, said flange being disposed to engage the successive lowermost products on said first supporting means as said member moves in between said first supporting means and said magazine and to push said lowermost products onto said second supporting means, and said arcuate surface being adapted to concurrently engage the product then at the lower end of said magazine whereby said member will support the products still in the magazine while a removed product is being transferred thereby to said second supporting means, said means for rotating said member comprising an electric motor having a normally open switch in circuit therewith and a shaft driven by said motor, said member being fixed to said shaft for rotation therewith, means for closing said switch to effect energization of said motor and thus rotation of said shaft and said member through a cycle which includes movement of said member from its said rest position, through its said second position, and then back to its said rest position, and means responsive to said member as it nears its said rest position again for causing said switch to open to thereby stop said motor for holding said member in its said rest position.

References Cited

UNITED STATES PATENTS

| | | | |
|---|---|---|---|
| 1,886,378 | 11/1932 | Dearsley | 221—277 X |
| 1,889,406 | 11/1932 | Goldschmidt | 221—150 |
| 2,244,670 | 6/1941 | Benedict | 221—150 |
| 2,304,484 | 12/1942 | Smith | 221—150 |
| 2,384,863 | 9/1945 | Warner | 221—150 |
| 2,426,707 | 9/1947 | Polsen et al. | 221—96 |
| 2,834,510 | 5/1958 | Cenotti | 221—150 |
| 2,858,042 | 10/1958 | Gabrielsen et al. | 221—238 |
| 2,950,024 | 8/1960 | Adler | 221—150 |
| 3,030,483 | 4/1962 | Rudolph et al. | 221—150 |
| 3,055,547 | 9/1962 | Radcliff et al. | 221—150 |
| 3,160,255 | 12/1964 | Ferraro et al. | 221—150 |
| 3,165,186 | 1/1965 | Zeiter | 221—150 |
| 3,224,643 | 12/1965 | White | 221—150 |

WALTER SOBIN, *Primary Examiner.*

ROBERT B. REEVES, *Examiner.*